(12) United States Patent
Galperin et al.

(10) Patent No.: US 6,640,215 B1
(45) Date of Patent: Oct. 28, 2003

(54) INTEGRAL CRITERION FOR MODEL TRAINING AND METHOD OF APPLICATION TO TARGETED MARKETING OPTIMIZATION

(75) Inventors: Yuri Galperin, Reston, VA (US); Vladimir Fishman, Farmington, CT (US)

(73) Assignee: Marketswitch Corporation, Sterling, VA (US)

( * ) Notice: Subject to any disclaimer, the term of this patent is extended or adjusted under 35 U.S.C. 154(b) by 0 days.

(21) Appl. No.: 09/525,238

(22) Filed: Mar. 15, 2000

Related U.S. Application Data

(60) Provisional application No. 60/124,219, filed on Mar. 15, 1999.

(51) Int. Cl.$^7$ .............................. G06E 1/00; G06E 3/00; G06F 15/18; G06G 7/00
(52) U.S. Cl. .............................. 706/19; 706/15; 706/16
(58) Field of Search ............................ 706/15, 19, 16

(56) References Cited

U.S. PATENT DOCUMENTS 5,933,813 A * 8/1999 Teicher et al. ................. 705/26

OTHER PUBLICATIONS

Piatetsky–Shapiro, et al., "Measuring Lift Quality in Database Marketing", SIGKDD Explorations, Copyright ©2000, ACM SIGKDD, Dec. 2000, vol. 2, Issue 2—pp. 81–85.

* cited by examiner

*Primary Examiner*—Emanuel Todd Voeltz
*Assistant Examiner*—Joseph P. Hirl
(74) *Attorney, Agent, or Firm*—Piper Rudnick LLP; Jerold I. Schneider

(57) ABSTRACT

The present invention maximizes modeling results for targeted marketing within a specific working interval so that lift within the working interval is higher than that obtained using traditional modeling methods. It accomplishes this by explicitly solving for lift through sorting a target list by predicted output variable outcome, calculating the integral criterion of lift for a desired range by using known response and non-response data for the target list, iterating on a set of input parameters until overfitting occurs, and testing results against a validation set.

9 Claims, 2 Drawing Sheets

INTEGRAL CRITERION FOR MODEL TRAINING AND METHOD OF APPLICATION TO TARGETED MARKETING OPTIMIZATION

This application claims the benefit of Provisional Application No. 60/124,219 filed Mar. 15, 1999.

FIELD OF THE INVENTION

This invention relates generally to the development of models to optimize the effects of targeted marketing programs. More specifically, this invention maximizes modeling results within a specific working interval, so that lift within the working interval is higher than that obtained using traditional modeling methods.

BACKGROUND OF THE INVENTION

The goal of targeted marketing modeling is typically to find a method to sort a set of prospective customers based on their attributes in a such a way that the cumulative response rate lift, or other desired or undesired behavior, for a given interval of the customer set (say the top 20%, the bottom 20%, or the middle 30%) is as high as possible, and the separation has a high level of significance (i.e., it offers significant predictive power).

The traditional approach to this problem is as follows: First, a model is built to simulate the probability of response as a function of attributes. Model parameters are computed in a special model fitting procedure. In this procedure the output of the model is tested against actual output and discrepancy is accumulated in a special error function. Different types of error functions can be used (e.g., mean square, absolute error); model parameters should be determined to minimize the error function. The best fitting of model parameters is an "implicit" indication that the model is good, but not necessarily the best, in terms of its original objective.

Thus the model building process is defined by two entities: the type of model and the error or utility function. The type of model defines the ability of the model to discern various patterns in the data. For example, Neural Network models use more complicated formulae than Logistic Regression models, thus Neural Network models can more accurately discern complicated patterns.

The "goodness" of the model is ultimately defined by the choice of an error function, since it is the error function that is minimized during the model training process.

Prior art modeling processes share two common drawbacks. They all fail to use the response rate at the top of the sorted list as a utility function. Instead, Least Mean Square Error, Maximum Likelihood, Cross-Entropy and other utility functions are used only because there is a mathematical apparatus developed for these utility functions. Additionally, prior art processes assign equal weight to all records of data in the sorted list. The marketers, however, are only interested in the performance of the model in the top of the list above the cut-off level, since the offer will be made only to this segment of customers. Prior art methods decrease the performance in the top of the list in order to keep the performance in the middle and the bottom of the list on a relatively high level.

What is needed is a process that builds a response model directly maximizing the response rate in the top of the list, and at the same time allows marketers to specify the segment of the customer list they are most interested in.

The present invention comprises a method that overcomes the limitations of the prior art through an approach which is best used to maximize results within a specific working interval to outperform industry standard models in the data mining industry. Standard industry implementations of neural network, logistic regression, or radial basis function use the technique of Least Means Squared as the method of optimizing predictive value. While correlated with lift, Least Means Squared acts as a surrogate for predicting lift, but does not explicitly solve for lift.

SUMMARY OF THE INVENTION

The present invention explicitly solves for lift, and therefore accomplishes the goal of targeted marketing. Mathematically, the effectiveness of a model that is based on the present invention is greater than models based on conventional prior art techniques.

The present invention explicitly solves for lift by:

Sorting customer/prospect list by predicted output variable outcome;

Calculating the integral criterion defined as a measure of lift over the desired range by using the known responders and non-responders;

Iterating on set of input parameters until overfitting occurs, (i.e., the utility function of the testing set begins to diverge from utility function of the testing set); and Testing of these results are then performed against the validation set.

There are other advantages to using the present invention over existing commercial techniques. First, it can be tuned to a predefined interval of a sorted customer list, for example from 20% to 50%. By ignoring the sorting outside the interval, the integral criterion of lift inside the working interval is higher.

Second, it is model independent. It may be used with a variety of different modeling approaches: Neural Network, Logistic Regression, Radial Basis Function, CHAID, Genetic Algorithms, etc.

The superior predictive modeling capability provided by using the present invention means that marketing analysts will be better able to: (i) predict the propensity of individual prospects to respond to an offer, thus enabling marketers to better identify target markets; (ii) identify customers and prospects who are most likely to default on loans, so that remedial action can be taken, or so that those prospects can be excluded from certain offers; (iii) identify customers or prospects who are most likely to prepay loans, so a better estimate can be made of revenues; (iv) identify customers who are most amenable to cross-sell and up-sell opportunities; (v) predict claims experience, so that insurers can better establish risk and set premiums appropriately; and identify instances of credit-card fraud.

DETAILED DESCRIPTION OF THE INVENTION

The present invention maximizes modeling results for targeted marketing within a specific working interval so that lift within the working interval is higher than that obtained using traditional modeling methods. It accomplishes this by explicitly solving for lift through: sorting a target list by predicted output variable outcome, calculating the integral criterion of lift for a desired range by using known response and non-response data for the target list, iterating on a set of input parameters until overfitting occurs, and testing results against a validation set.

For example, assume a pool of customers is sorted based on a classification score, where:

N—total number of customers i—number of a current customer in the sorted set x=i/N f(x)—response rate $F_1(x)$—upper cumulative response rate (average response rate from 0 to i=N*x)

$F_2(x)$—lower cumulative response rate (average response rate from i=N*x to N)

The present invention measures the integral criterion of lift within a range [x1, x2] (say, between 20% and 50%) calculated by the formula:

$$\text{MSI\_Err}(x_1, x_2) = \frac{1}{(x_2 - x_1)} \int_{x_1}^{x_2} (F_U - F_L) d\xi =$$

$$\frac{1}{(x_2 - x_1)} \int_{x_1}^{x_2} (F(\xi)/(\xi(1-\xi)) - a/(1-\xi)) d\xi$$

where α is a response rate in the sample.

The main technical difficulty in using the present invention, as defined above, is that it is not a continuous function of the model weights. Thus, traditional gradient training algorithms like Back Propagation and others cannot be applied.

To implement the model training based on the present invention, a new hybrid method that combines gradient and non-gradient (specifically, Simulating Annealing) techniques has been developed.

The training algorithm based on this hybrid method is defined as follows:

$$W_{new} = W_{current} + \Delta W - \frac{\partial Err}{\partial W} * \lambda_2 * d$$

where:

$W_{new}$, $W_{current}$—new and current values of the weight vector $\Delta W$—non-gradient component of weight adjustment $$\frac{\partial Err}{\partial W} * \lambda_2 * d$$

gradient component of weight adjustment;

$\lambda_2$—scaling factor

Err—value of the gradient criterion defined by:

$$Err = \sum \ln(1 + g_i) - \sum_{i \in resp} \ln(g_i),$$

$g_i$—current output variable (usually propensity) score of a prospect i

The non-gradient component is calculated according to the simulated annealing algorithm, with two important enhancements. The random vector is biased towards the value of the gradient of the present invention gradient function F(ξ) and it is based not on a classical random number generator, but instead on the LDS (low discrepancy sequence) generator. Both enhancements make the algorithm more accurate and improve performance.

The factor d is decreasing with the "annealing temperature." That allows the algorithm to converge quickly when the "temperature" is high and fine tune the weights to maximize lift at the end of the training process.

Figure 1:
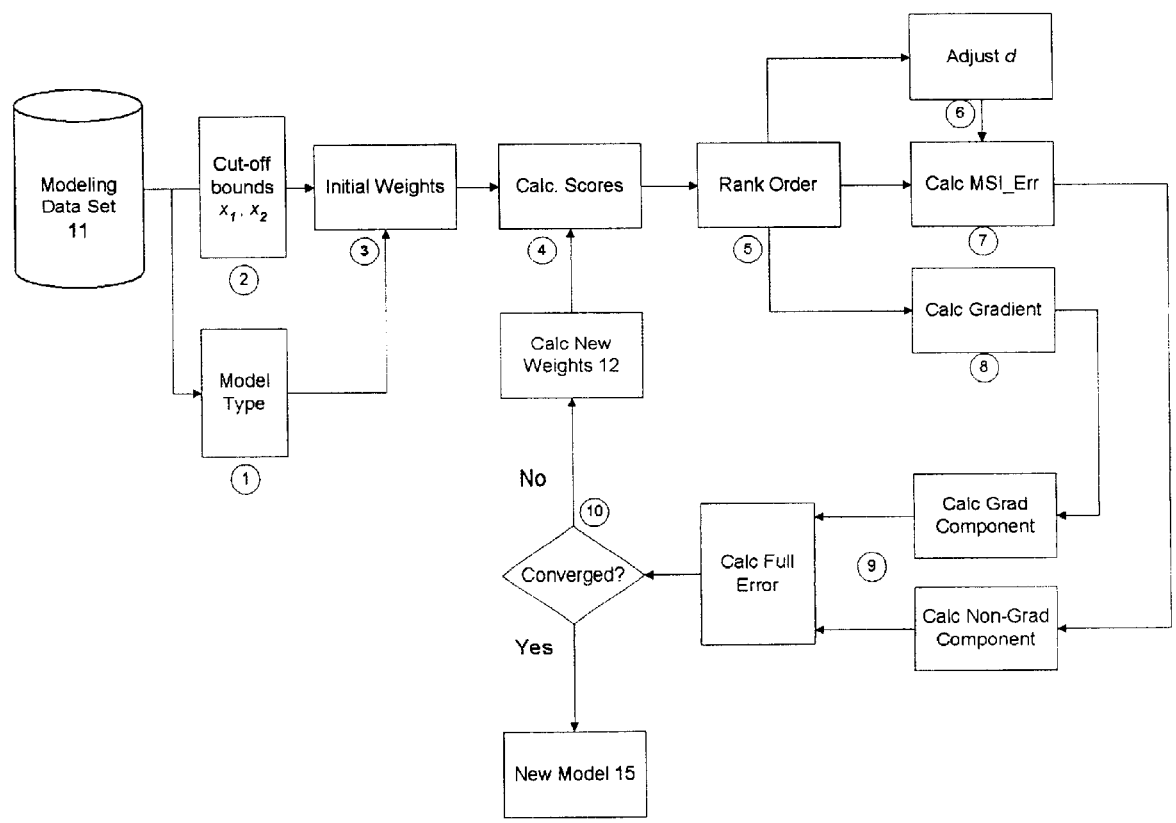
FIG. 1 shows the dataflow of the method of training the model of the present invention.

The dataflow of the method for training the model is shown in the FIG. 1. Acting on modeling data set 11, the first step is to choose a model type at 1. Model types can include Logistic Regression, Neural Network, Radial Basis Function, etc. Next, cutoff bounds $x_1$, $x_2$ are chosen at 2 and initial weights (weight vectors) for the chosen model type are assigned at step 3. These initial weights (weight vectors) are then used to calculate output variable classification scores at 4 for the training data in modeling data set 11. For targeted marketing, these will generally be propensity scores. The training data in modeling data set 11 is then ordered by rank of scores at the rank ordering step 5.

The present invention then uses the simulated annealing technique to adjust a factor d according to the formula $d_{i+1} = d_i \cdot e^{rt}$, where $d_i$ is a value of d on current iteration, $d_{i+1}$ is the value on the next iteration. At step 7, the calculation of the integral criterion MSI_ERR is done using the above formula. The method for training then calculates a gradient criterion at step 8 using the above formula and then calculates the gradient component and non-gradient components of the Full Error.

The method then checks for convergence at step 10 (by checking for $$\left( \Delta W - \frac{\partial Err}{\partial W} * \lambda_2 * d \right) < \varepsilon, \text{ where } \varepsilon \text{ is tolerance} \right).$$

If convergence occurs, the training is completed to for a new model 15. If not, new weights (weight vectors) are calculated at 11 and the method returns to step 4 to calculate a new set of scores for the training data in modeling data set 11 for another iteration.

Figure 2:
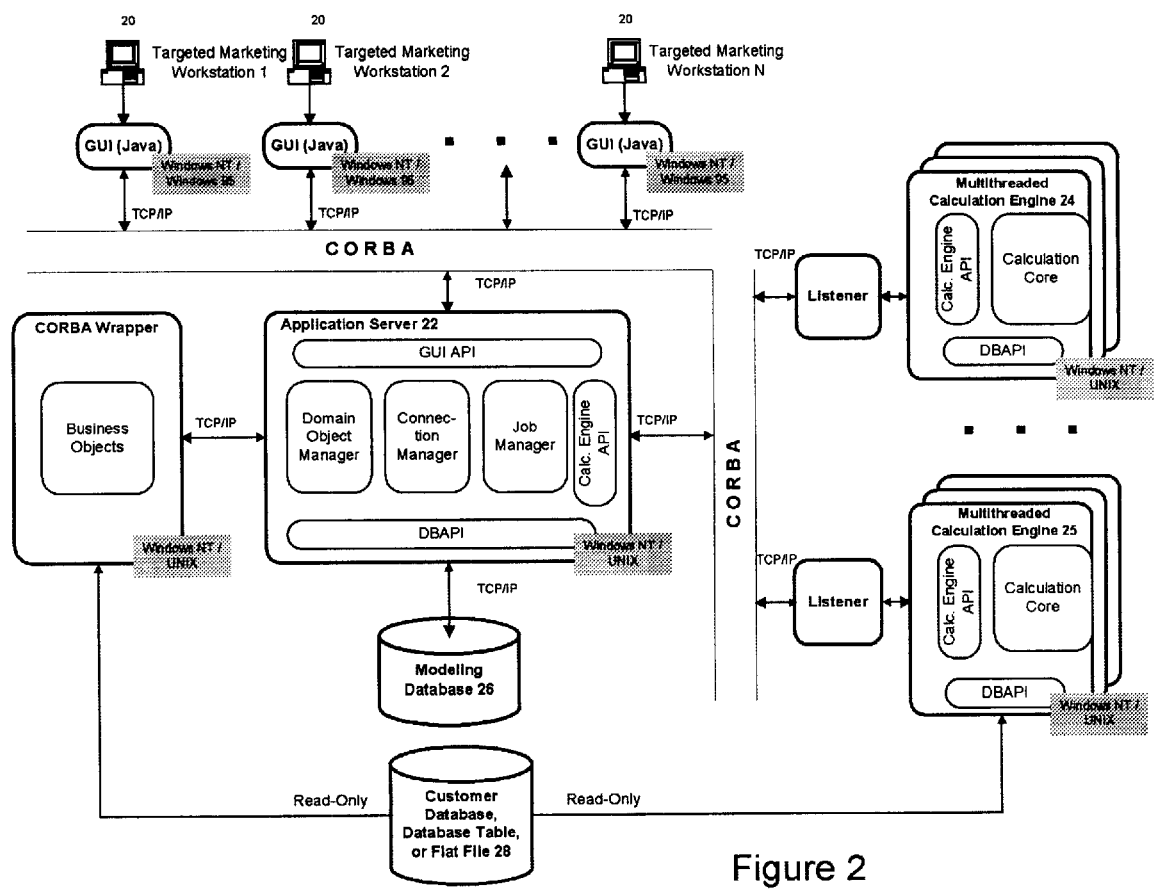
FIG. 2 illustrates a preferred system architecture for employing the present invention.

The present invention operates on a computer system and is used for targeted marketing purposes. In a preferred embodiment as shown in FIG. 2, the system runs on a three-tier architecture that supports CORBA as an intercommunications protocol. The desktop client software on targeted marketing workstations 20 supports JAVA. The central application server 22 and multithreaded calculation engines 24, 25 run on Windows NT or UNIX. Modeling database 26 is used for training new models to be applied for targeted marketing related to customer database 28. The recommended minimum system requirements for application server 22 and multithreaded calculation engines 24, 25 are as follows:

| Intel Platform | |
|---|---|
| Processor: | One 300 Mhz Pentium II |
| Memory: | 128 MB |
| Disk Space: | 10 MB* |
| Permissions: | Read/Write permissions in area of server installation (no root permissions) |
| Operating System: | NT 4.0 (Service Pack 3 or higher) |
| Protocol: | TCP/IP |
| CD-ROM Drive | |
| SPARC Platform | |
| Processor: | Ultra Sparc |
| Memory: | 256 MB (Recommended minimum) |
| Disk Space: | 10 MB* |
| Permissions: | Read/Write permissions in area of server installation (no root permissions) |

-continued

| | |
|---|---|
| Operating System: | Sun Solaris 2.6, Solaris 7 (2.7) |
| Protocol: | TCP/IP |
| Daemons: | Telnet and FTP (Optional) |

*Approximately 100 MB/1 million records in customer database. The above assumes the user client is installed on a PC with the recommended configuration found below.

Digital Platform

| | |
|---|---|
| Processor: | Digital |
| Memory: | 256 MB |
| Disk Space: | 10 MB* |
| Permissions: | Read/Write permissions in area of server installation (no root permissions) |
| Operating System: | Digital UNIX 4.0e, Tru64 (5.0) |
| Protocol: | TCP/IP |
| Daemons: | Telnet nd FTP (Optional) |

HP Platform

| | |
|---|---|
| Processor: | HP |
| Memory: | 256 MB |
| Disk Space: | 10 MB* |
| Permissions: | Read/Write permissions in area of server installation (no root permissions) |
| Operating System: | HP/UX 11 (32 Bit) |
| Protocol | TCP/IP |
| Daemons: | Telnet and FTP (Optional) |

The recommended minimum requirements for the targeted marketing workstations 20 are as follows:

| | |
|---|---|
| Client Installation | |
| Processor: | Pentium II, 166 Mhz or higher |
| Memory: | 64 MB |
| Disk Space: | 50 MB free hard drive space |
| Operating System: | NT 4.0 (Service Pack 3 or higher), Windows 95/98 or any JDK 1.18 compliant platform |
| Protocol: | TCP/IP |
| Oracle Client: | 8.x (Optional) |

Using the present invention in conjunction with a neural network as a preferred embodiment, the present invention provides a user with new models for analyzing data to indicate the individuals or classes of individuals who are most likely to respond to targeted marketing.

We claim:

1. A method of training models to maximize output variable modeling results within a specific interval, comprising:

providing a target list from a modeling database;

selecting a model type;

choosing bounds for the specific interval;

setting initial weight vectors $W_i$ for the chosen model type;

starting a first iteration by using the initial weight vectors $W_i$ to calculate output variable classification scores $g_i$ for each target from the target list;

sorting the list by output variable classification score;

calculating an integral criterion of lift over the range of the specific interval;

calculating a gradient criterion using the formula:

$$Err = \sum \ln(1 + g_i) - \sum_{i \in resp} \ln(g_i),$$

calculating gradient and non-gradient components of the full error;

checking the full error for convergence below a tolerance level $\epsilon$;

finalizing a new model when convergence occurs; and calculating new weight vectors $W_{new}$ and beginning another iteration by using the new weight vectors to recalculate output variable classification scores for each target from the target list.

2. The method of training models to maximize output variable modeling results within a specific interval of claim 1, wherein the integral criterion of lift over the specified interval is calculated by the formula:

$$MSI\_Err(x_1, x_2) = \frac{1}{(x_2 - x_1)} \int_{x_1}^{x_2} (F_U - F_L) d\xi =$$

$$\frac{1}{(x_2 - x_1)} \int_{x_1}^{x_2} (F(\xi)/(\xi(1-\xi)) - a/(1-\xi)) d\xi$$

wherein:

N—total number of targets i—number of a current target in the sorted set x=i/N f(x)—output variable $F_1(x)$—upper cumulative output variable (average output variable from 0 to i=N*x)

$F_2(x)$—lower cumulative output variable (average output variable from i=N*x to N)

over an interval within a range [x1, x2] where $\alpha$ is a response rate in the sample.

3. The method of training models to maximize output variable modeling results within a specific interval of claim 1, wherein a new value of the integral criterion is calculated using the new weight vectors $W_{new}$ calculated by the formula:

$$W_{new} = W_{current} + \Delta W - \frac{\partial Err}{\partial W} * \lambda_2 * d$$

where:

$W_{new}$, $W_{current}$—new and current values of the weight vector $\Delta W$—non-gradient component of weight adjustment $$\frac{\partial Err}{\partial W} * \lambda_2 * d$$

—gradient component of weight adjustment;

d—a "simulated annealing" factor input for the first iteration and adjusted for each iteration according to the formula $d_{i+1} = d_i \cdot e^{rt}$, where $d_i$ is a value of d on current iteration, $d_{i+1}$ is the value on the next iteration; and $\lambda_2$—scaling factor.

4. The method of training models to maximize output variable modeling results within a specific interval of claim 3, wherein the full error is measured as $W_{new} - W_{current}$.

5. The method of training models to maximize output variable modeling results within a specific interval of claim 1, wherein the model is chosen from the group consisting of neural networks, logistic regression, radial basis function, CHAID, and genetic algorithms.

6. The method of training models to maximize output variable modeling results within a specific interval of claim 1, wherein each target is a customer.

7. The method of training models to maximize output variable modeling results within a specific interval of claim 6, wherein the output variable is propensity.

8. The method of training models to maximize output variable modeling results within a specific interval of claim 6, wherein the output variable is the response rate in targeted marketing.

9. The method of training models to maximize output variable modeling results within a specific interval of claim 1, wherein the new model is tested for accuracy using a validation set of targets.

* * * * *